US008548861B2

(12) United States Patent
Buonanno et al.

(10) Patent No.: US 8,548,861 B2
(45) Date of Patent: Oct. 1, 2013

(54) MULTIMEDIA B2B OPPORTUNITY AND ERROR DETECTION AND RESOLUTION ENGINE

(75) Inventors: Mark Buonanno, Sunnyvale, CA (US); Chris Shenefiel, Oakton, VA (US); Michael Swailes, Pleasanton, CA (US); Stephen Quatrano, Lexington, MA (US); Brian Carrier, Leesburg, VA (US)

(73) Assignee: Cisco Technology, Inc., San Jose, CA (US)

(*) Notice: Subject to any disclaimer, the term of this patent is extended or adjusted under 35 U.S.C. 154(b) by 1662 days.

(21) Appl. No.: 11/965,678

(22) Filed: Dec. 27, 2007

(65) Prior Publication Data

US 2008/0104596 A1    May 1, 2008

Related U.S. Application Data

(62) Division of application No. 09/727,841, filed on Nov. 30, 2000, now abandoned.

(51) Int. Cl.
*G06Q 30/00* (2012.01)

(52) U.S. Cl.
USPC ........................................................ 705/26.1

(58) Field of Classification Search
USPC ............................................... 705/26.1–27.2
See application file for complete search history.

(56) References Cited

U.S. PATENT DOCUMENTS

| | | | |
|---|---|---|---|
| 4,554,418 A | 11/1985 | Toy | |
| 4,899,375 A | 2/1990 | Bauer et al. | |
| 5,043,983 A | 8/1991 | Dorst et al. | |
| 5,287,505 A | 2/1994 | Calvert et al. | |
| 5,414,754 A | 5/1995 | Pugh et al. | |
| 5,822,410 A | 10/1998 | McCausland et al. | |
| 5,983,198 A | 11/1999 | Mowery et al. | |
| 6,012,045 A | 1/2000 | Barzilai et al. | |
| 6,029,140 A | 2/2000 | Martin et al. | |
| 6,032,184 A | 2/2000 | Cogger et al. | |
| 6,182,277 B1 | 1/2001 | DeGroot et al. | |
| 6,289,333 B1 | 9/2001 | Jawahar et al. | |
| 6,328,207 B1 | 12/2001 | Gregoire et al. | |
| 6,363,411 B1 | 3/2002 | Dugan et al. | |
| 6,418,461 B1 | 7/2002 | Barnhouse et al. | |

(Continued)

FOREIGN PATENT DOCUMENTS

WO      9903053      1/1991

OTHER PUBLICATIONS

'Industrial applications of distributed AI.' Chaib-draa, B. Assocation for Computing Machinery. Communications of the ACM. 38.1 (Nov. 1995) 49. Retrieved via ProQuest.*

(Continued)

*Primary Examiner* — Michael Misiaszek
(74) *Attorney, Agent, or Firm* — Lempia Summerfield Katz LLC

(57) ABSTRACT

A method and system for automatically handling exceptions in a business-to-business transaction. E-commerce internet gateways through which the business-to-business transaction passes are monitored for exceptions. When an exception is detected, an intelligent contact manager automatically determines and then locates the representative(s) authorized to resolve this exception. A unified communication system is then utilized to automatically contact and notify the authorized representative(s) of the exception. A web collaboration system is then utilized to automatically establish a collaboration session between representatives of the business-to-business transaction so that the exception can be readily resolved.

14 Claims, 11 Drawing Sheets

(Background)

(56) References Cited

U.S. PATENT DOCUMENTS

| | | |
|---|---|---|
| 6,438,599 B1 | 8/2002 | Chack |
| 6,530,518 B1 | 3/2003 | Krichilsky et al. |
| 6,606,744 B1 | 8/2003 | Mikurak |
| 6,779,030 B1 | 8/2004 | Dugan et al. |
| 6,957,186 B1 | 10/2005 | Guheen et al. |
| 2001/0032263 A1 | 10/2001 | Gopal et al. |
| 2001/0042131 A1* | 11/2001 | Mathon et al. ............... 709/238 |
| 2001/0044840 A1* | 11/2001 | Carleton ....................... 709/223 |
| 2001/0051878 A1 | 12/2001 | Yong |
| 2002/0049622 A1 | 4/2002 | Lettich et al. |
| 2002/0059131 A1 | 5/2002 | Goodwin et al. |
| 2002/0071440 A1 | 6/2002 | Cerami et al. |
| 2002/0072992 A1 | 6/2002 | Elms et al. |
| 2002/0073355 A1 | 6/2002 | Cerami et al. |
| 2002/0078017 A1 | 6/2002 | Cerami et al. |
| 2002/0087680 A1 | 7/2002 | Cerami et al. |
| 2002/0138320 A1 | 9/2002 | Robertson et al. |
| 2002/0169626 A1 | 11/2002 | Walker et al. |
| 2002/0188530 A1 | 12/2002 | Wojcik et al. |
| 2002/0194272 A1 | 12/2002 | Zhu |
| 2003/0177071 A1 | 9/2003 | Treese et al. |
| 2004/0049562 A1 | 3/2004 | Kikinis |
| 2005/0021713 A1 | 1/2005 | Dugan et al. |

OTHER PUBLICATIONS

Stolowitz Ford Cowger LLP, Listing of Related Cases, Oct. 6, 2011.
Look Smart; Find Articles: AT&T, MCI to Release New Management Tools; Jan. 1994; 3 pages.

* cited by examiner (Background)

(Background)

MULTIMEDIA B2B OPPORTUNITY AND ERROR DETECTION AND RESOLUTION ENGINE

CROSS-REFERENCE TO RELATED APPLICATION

This application is a division of U.S. application Ser. No. 09/727,841, filed Nov. 30, 2000, now abandoned which is hereby incorporated by reference in its entirety.

FIELD OF THE INVENTION

The present invention relates to an apparatus and method for a multimedia B2B order processing error detection and resolution engine.

BACKGROUND OF THE INVENTION

Currently, the business-to-business (B2B) market is exploding. The primary attraction and allure of B2B lies in its potential for enabling a large number of highly automated low-cost transactions to be conducted on a regular basis with multiple trading partners. Ideally, the B2B model attempts to eliminate any form of human interaction in order to reduce costs while, at the same time, increasing the speed and efficiency of executing transactions.

In B2B electronic systems, corporations use electronic data interchange (EDI) transactions to conduct purchases among their trading partners with the help of existing business services offered by a Value Added Network provider, also known as a VAN. FIG. 1 shows a prior art EDI direct procurement buying process. The EDI transaction leaves the supplier 101 and is routed via a gateway 102 past a firewall and through a private lease line 104. On the receiving end, the EDI transaction passes through the recipient's firewall 105 to a gateway 106 and eventually enters the business partner's system 107. Two VANs 108 and 109 are used to facilitate this process. The role of a VAN is critical in resolving any discrepancies or technical loading problems that might occur before, during or after EDI transactions conducted between business partners. Specifically, EDI transactions enter a gateway between the different partners, and if any specific problems occur, the VAN will immediately notify the partner of the problems that occurred during transmission from any party. It is the responsibility of the VAN to help resolve any errors, discrepancies, or glitches which may cause the EDI to fail. By utilizing a VAN, one can minimize delays associated with and smooth out any exceptions to the normal course of EDI transactions. However, VANs charge a fee for their services and there are often more than one VAN involved since there may be more than one gateway and multiple business partners.

Furthermore, even with the aid of a VAN, delays in handling B2B exceptions are inevitable. FIG. 2 shows a process of how B2B exceptions are typically handled in the prior art. A B2B transaction is initiated between a buyer and a supplier, step 201. The work process flow is monitored for any errors which may arise, step 202. If there are no errors, the transaction completes successfully, step 203. However, if an error does occur, the VAN generates an exception report noting this error, step 204. The transaction is then halted pending human closure, step 205. Even with the help of a VAN, the transaction may nonetheless suffer delays because the error report goes unnoticed for a few days. In some cases, the buyer's and/or seller's representative, responsible for handling errors, is temporarily unavailable (e.g., sick, on vacation, transferred, on a business trip, tied up on another project, etc.). Millions of dollars of goods and materials can be hung up several days due to a minor error simply because one particular individual is not there to oversee and remedy the error. And given that many companies operate on a just-in-time inventory scheme, a delay in the shipment of millions of dollars of parts can dramatically effect their manufacturing process.

Due to the extra layer of administrative, cost, and overhead imposed by VANs and their private lease lines they employ, it is anticipated that B2B transactions will shift towards being conducted via the Internet. EDI transactions are starting to be sent via the Internet as XML EDI, cXML, RosettaNet, and other formats as well, thereby eliminating the third-party VANs. However, the functions provided by the traditional VANs still must be met. Thus, what is needed is a substitute virtual VAN for B2B Internet transactions, especially given the inherent unreliability of the Internet. It would be highly preferable if such a virtual VAN were inexpensive to implement, operate, and use. It would also be highly preferable if such a virtual VAN could minimize the delays associated with and help facilitate resolution of any errors which may occur in any B2B transaction. The present invention offers a unique, novel solution of just such a virtual VAN for handling B2B exceptions.

SUMMARY OF THE INVENTION

The present invention pertains to an apparatus and method for automating the mechanisms of collaboration for business-to-business transactions by utilizing specific unified communications collaboration technology in conjunction with advanced web collaboration technology in order to improve B2B transaction reliability over the Internet or via any other form of electronic communication. In one embodiment, an integrated multimedia B2B order processing error detection and resolution engine is provided. This error detection and resolution engine continuously monitors e-commerce internet gateways through which the business-to-business transaction passes for any exceptions which may periodically occur. When an exception is detected, an intelligent contact manager automatically determines and then locates the appropriate representative(s) authorized to resolve this exception. A unified communication system is then utilized to automatically contact and notify the authorized representative(s) of the exception. Thereupon, a web collaboration system is initiated to automatically establish a collaboration session between representatives of the business-to-business transaction so that the exception can be readily resolved.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An apparatus and method for a multimedia B2B order processing error detection and resolution engine is described. The present invention automates the methods of collaboration for business transactions by utilizing specific unified communications collaboration technology in conjunction with advanced web collaboration technology in order to improve business-to-business transaction reliability over the Internet or via any other form of electronic communication. This ensures that business transactions will be conducted more accurately, swiftly and with greater reliability due to the collaboration technology.

First, the different business models to which the present invention may be applied are shown. Examples of how the present invention may be applied to the various business models are then described. Finally, the various specific pieces forming the unified communication technology along with advanced web collaboration technology for implementing and using the error detection resolution engine of the present invention is described in detail. However, in the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Figure 1:
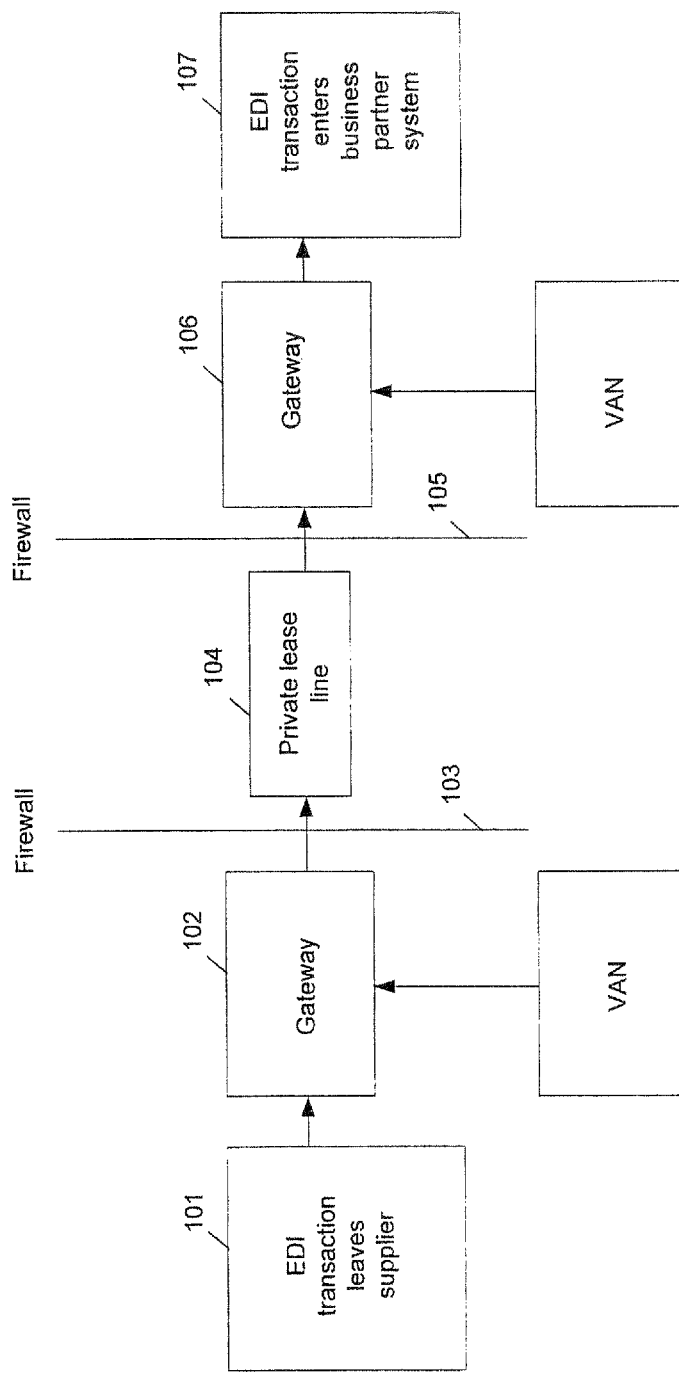
FIG. 1 shows a prior art EDI direct procurement buying process.
Figure 2:
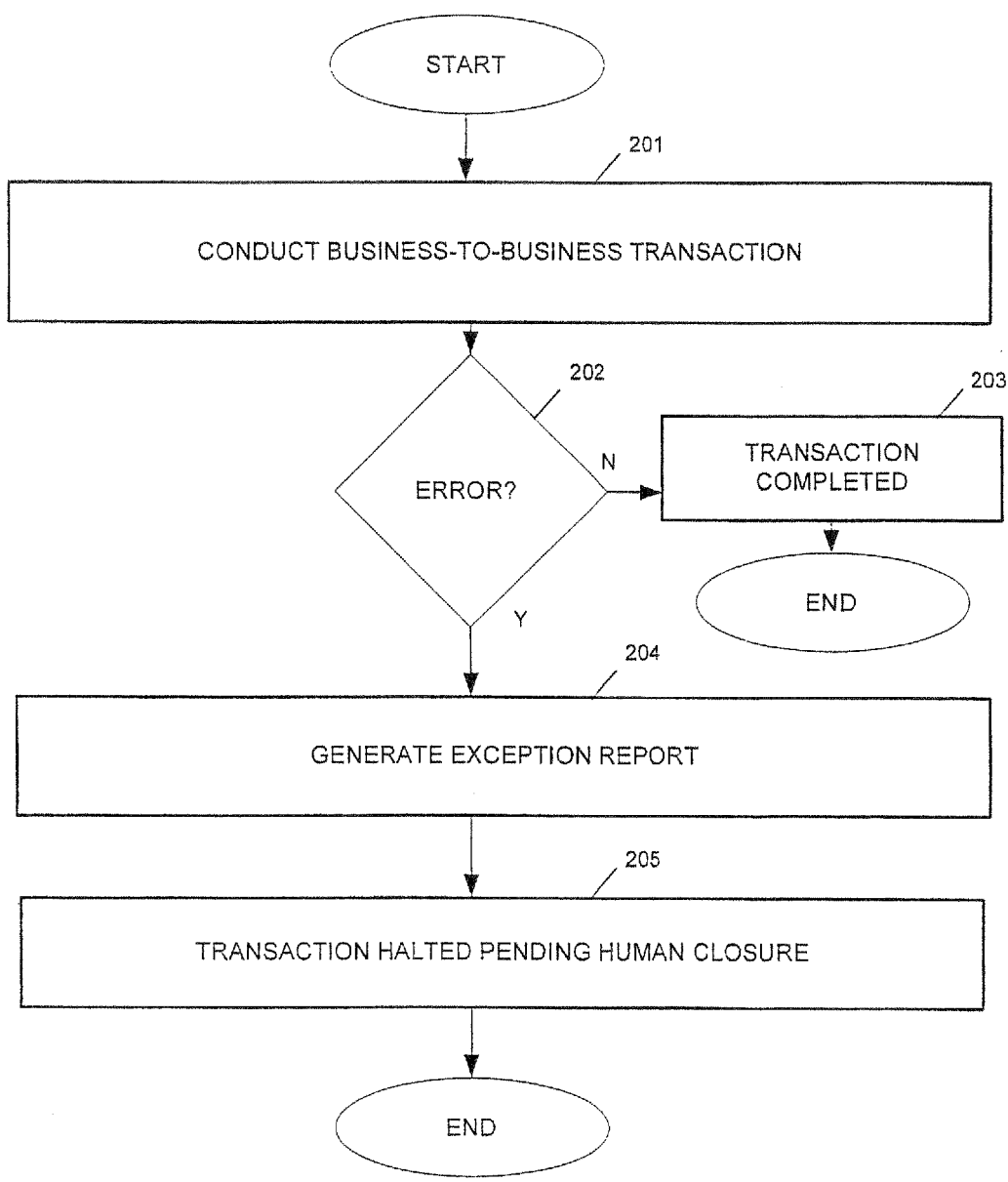
FIG. 2 shows a process of how B2B exceptions are typically handled in the prior art.
Figure 3:
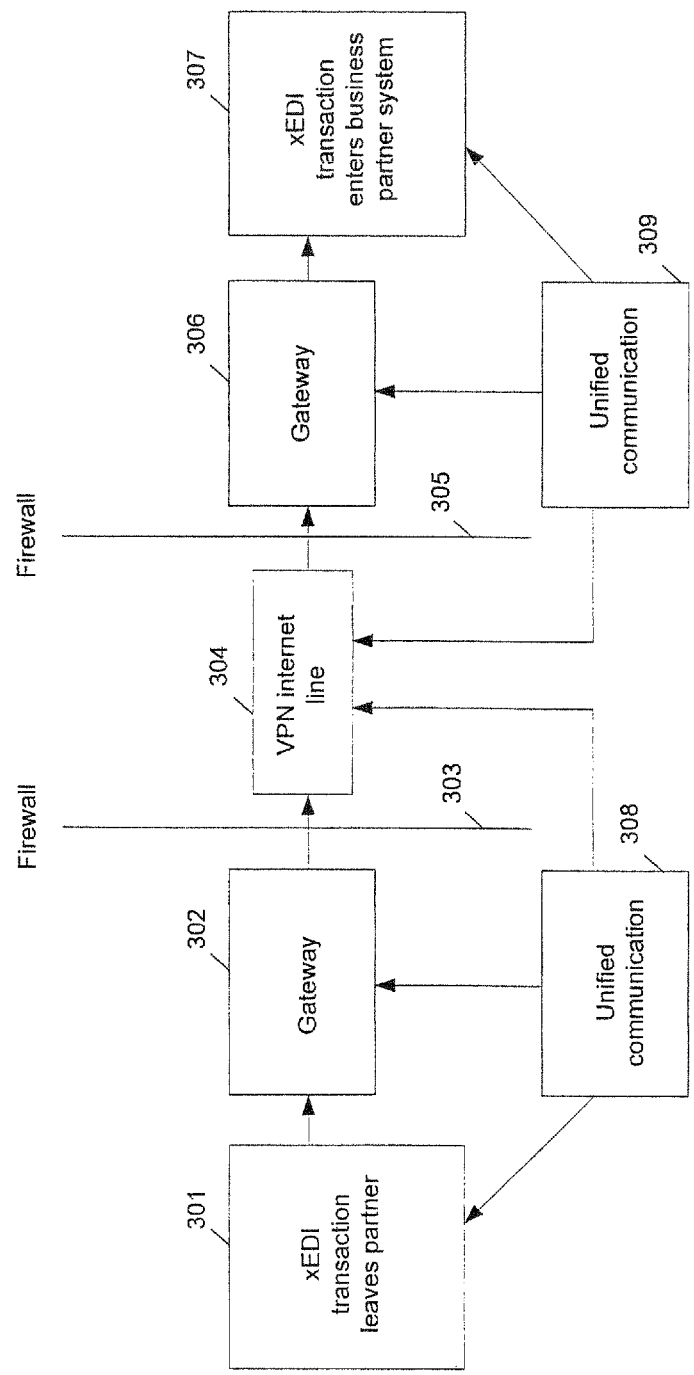
FIG. 3 shows a collaboration technology assisted procurement process according to one embodiment of the present invention.

Referring to FIG. 3, a collaboration technology assisted procurement process according to one embodiment of the present invention is shown. The xEDI transaction leaves the partner's system 301 via a gateway 302 and passes through the partner's firewall 303. The xEDI transaction is routed through the VPN Internet line 304 and is eventually received by the other business partner's system 307 after passing through firewall 305 and gateway 306. Unified communications technology 308 on the sending partner's side is used in resolving error exceptions which may arise from processes 301-304. Similarly, unified communications technology 309 is used in resolving error exceptions which may arise from processes 304-307. Thereby, the present invention can provide exception monitoring and collaboration extensions to traditional procurement transactions between known partners with established business processes.

Figure 4:
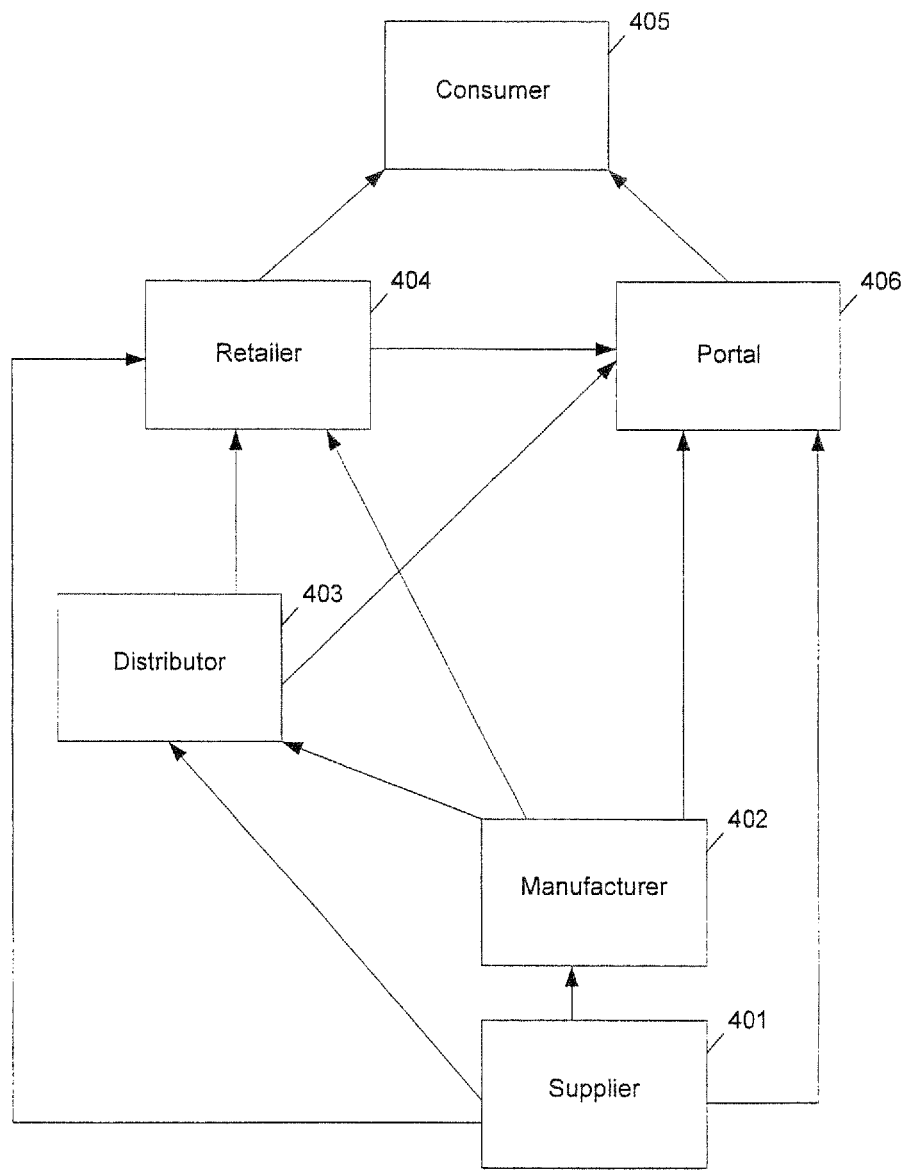
FIG. 4 shows business-to-business processes upon which the present invention may be applied.

FIG. 4 shows business-to-business processes upon which the present invention may be applied. The present invention is applicable between supplier 401 to manufacturer 402; supplier 401 to distributor 403; supplier 401 to retailer 404; manufacturer 402 to distributor 403; and manufacturer 402 to retailer 404. The retailer 404 can then sell to the consumer 405. In addition, the manufacturer 402 and/or supplier 401 can sell directly to the consumer via a portal 406. The present invention is applicable to instances involving traditional procurement transactions between known partners with established business processes.

Figure 5:
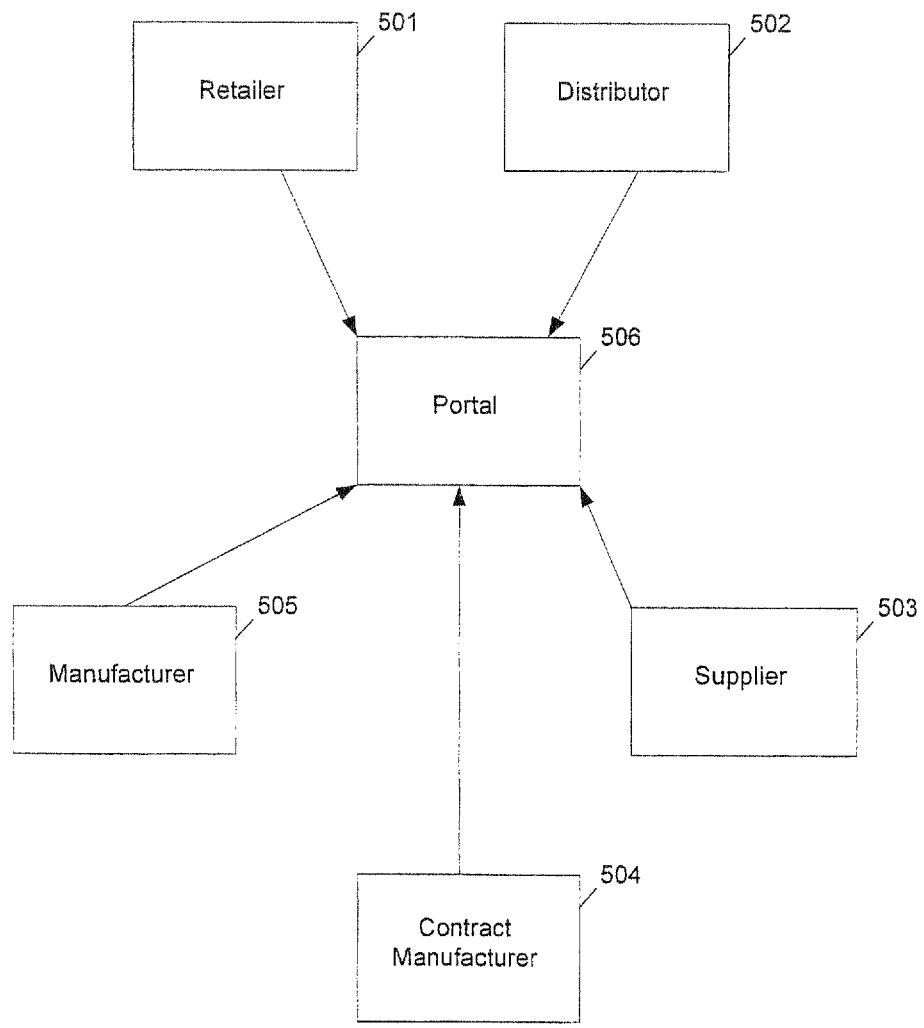
FIG. 5 shows a business-to-business trade community or auction upon which the present invention may be applied.

FIG. 5 shows a business-to-business trade community or auction upon which the present invention may be applied. These processes encompass business communities or Internet portals where parties are either known or unknown, but the products are relevant. Parties such as retailer 501, distributor 502, supplier 503, contract manufacturer 504, and manufacturer 505 can conduct EDI transactions through Internet portal 506.

Figure 6:
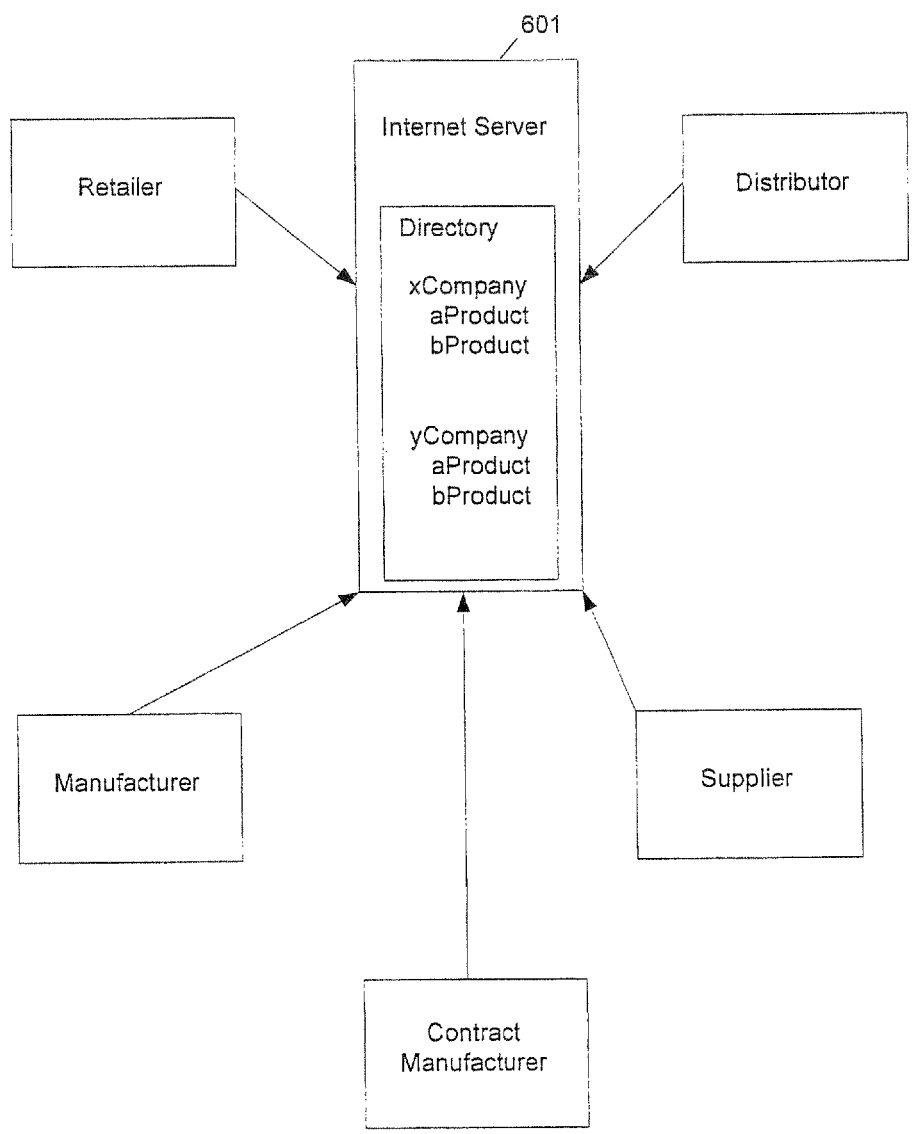
FIG. 6 shows an open search business-to-business transaction model upon which the present invention may be applied.

FIG. 6 shows an open search business-to-business transaction model upon which the present invention may be applied. In the open search procurement process, business partners query Internet servers 601 for any partner that might post information on the desired service or product. This can be accomplished with an ordinary search engine or with an advanced services search engine. In this embodiment, open Internet search procurement process that utilize sophisticated search technology infrastructure (e.g., Microsoft Biztalk, HP eSpeak, Sun Jini, etc.) to locate potential sources of material and products where the specific collaboration technologies either reach the correct parties, conduct transactions and/or establish a collaboration session to complete their business transaction.

In each of the different business models shown in FIGS. 3-6 and described above, the multimedia B2B order processing error detection resolution engine of the present invention can be applied to improve transaction exception handling. Moreover, the present invention provides a mechanism for locating the appropriate person(s) and initiating the appropriate electronic communication models to correct, load, and authorize and/or assist in the completing of the business transactions. Whereas general practitioners of electronic communication have automated interaction between businesses to reduce business friction, paperwork, and supply chain time to market, they nonetheless still require human intervention. The implementation of the automated collaboration technologies according to one embodiment of the present invention entails monitoring the Internet pipe, gateways in and out of partner. Alternatively, the collaboration processes can be inserted in the business process workflow as well. The general procurement process includes the tactical process components: Demand Planning (Identify Requirements), Requisition, Purchase, Approve, Order, Receive, Distribution, Payment, Measurement, and Forecast. And whereas the current industry solution for business-to-business purchasing (EDI) is limited to supporting pre-defined and static business purchasing relationships, one benefit of the present invention is to support dynamic business relationships using Internet Infrastructure technologies that are divided into the following categories: Security (e.g., Digital Certificates, PGP for encryption, etc.); Communications (e.g., VoIP, Instant Messaging, SNPP/SMTP for paging, and Web collaboration applications); and Messaging (e.g., SMTP/POP3/IMAP and LDAP Directories).

An exemplary purchasing transaction methodology according to one embodiment of the present invention is now described. The first step in the purchasing transaction methodology is for the purchaser to find a supplier. If the supplier is already on record, that supplier is placed into the Enterprises' LDAP directory for future and approved use. The Enterprise directory contains all approved suppliers information (e.g., data description format-XML, security certificate to protect contract pricing, and other relevant purchasing information). If the purchasing application does not have a supplier on record or is interested in finding new suppliers, the purchasing application searches an network-based, shared LDAP directory that describes known vendors, their attributes (e.g., location, credit terms, etc.) and serves as the starting point for the transaction. Once a vendor(s) is found in the LDAP directory, the purchasing application creates an order and sends it. Vendor information (for the purchasing party) is stored in an LDAP directory such that the ERP application, messaging infrastructure, and security infrastructure have equal access to vendor information. Using the LDAP directory entry, the buying party retrieves the PGP key, Certificate and addressing information.

For ad-hoc request for bids, Email requests can be sent to multiple suppliers simultaneously. The buying application can create one purchase request in the form of XML email to multiple recipients. The purchasing application would then receive messages from different potential suppliers containing proposed prices and delivery time. The purchasing application can then select the most satisfactory terms and issue a purchase transaction. Purchasing transactions are initiated by a buying party through an existing procurement (ERP) application. This application creates an EDI-XML representation of the transaction data, signs it with a digital certificate (to support non-repudiation and identification) and encrypts the message inside a PGP envelope. The purchasing application addresses the purchase request and sends it through the existing Internet Email infrastructure using SMTP. The purchasing application sets a timer and waits for a confirmation response form the vendor. If the vendor does not issue a confirmation within X seconds (X being a predefined amount of time), the purchasing application issues an exception. Exceptions are discussed in detail below.

The suppliers (email recipients) receive the messages, decrypt and certify the originators and then parse the EDI-XML description of the purchase request. The first return receipt is sent back to the buyer as part of the ESMTP message protocol. This receipt confirms that the destination system received the message (e.g., delivery success). The second return receipt is sent from the supplier's application with specific confirmation of receipt. Since the email contains the address of the originator of the purchase request (e.g., the 'From:' field of the email envelope and is described in the digital certificate), the supplier can verify the originator and reply with a receipt confirmation. The final receipt is sent from the supplier as a confirmation of purchase with delivery and payment terms. All data interactions and receipts conform to the EDI/XML data definition format.

Exceptions are rapidly handled by using the system interfaces and confirmations which provide an infrastructure that can emit exception notifications. But these notifications are only as effective as the accessibility of resources who handle the exceptions. The most common method of exception handling today is to notify humans of the problem and wait for closure. However, the present invention covers automated and computer-supported collaboration that improve exception handling response time and cost management. When a purchasing exception occurs, it is based on email notifications. Email notifications are issued under the following conditions: timer expiration, transaction exception, and network exception. In a timer expiration, when a sending application does not receive a confirmation within a pre-determined time period, that application can issue an email notification that represents the exception. A transaction exception is generated when the content, format, security, availability, or other characteristics of the transaction are out of predetermined boundaries. A network exception is issued when the messaging infrastructure cannot support the message transaction for any number of reasons (e.g., connectivity, bandwidth, reliability, etc.).

Once an exception is issued, it is presented into an Internet communications infrastructure that can send that notification through any number of different media types. The notification can be sent in real-time via a telephone call that presents an announcement and Interactive Voice Response (IVR) systems to resolve the problem to the called party. Furthermore, a sequence of contacts for the called party can be made in order to increase the likelihood of reaching them through a real-time telephone call. An SMS message can be sent to the called party's pager or cell phone. In addition, incoming calls can be routed through a series of telephone numbers based on time or day of week so that the caller can reach any number of people based on their availability. Moreover, non real-time applications such as voice messaging, email messaging, faxing, and/or phone calls that present an announcement and IVR to resolve the problem to the called party can be implemented. It should be noted that one or more of the above mechanisms can be employed to help resolve the exception.

Figure 7:
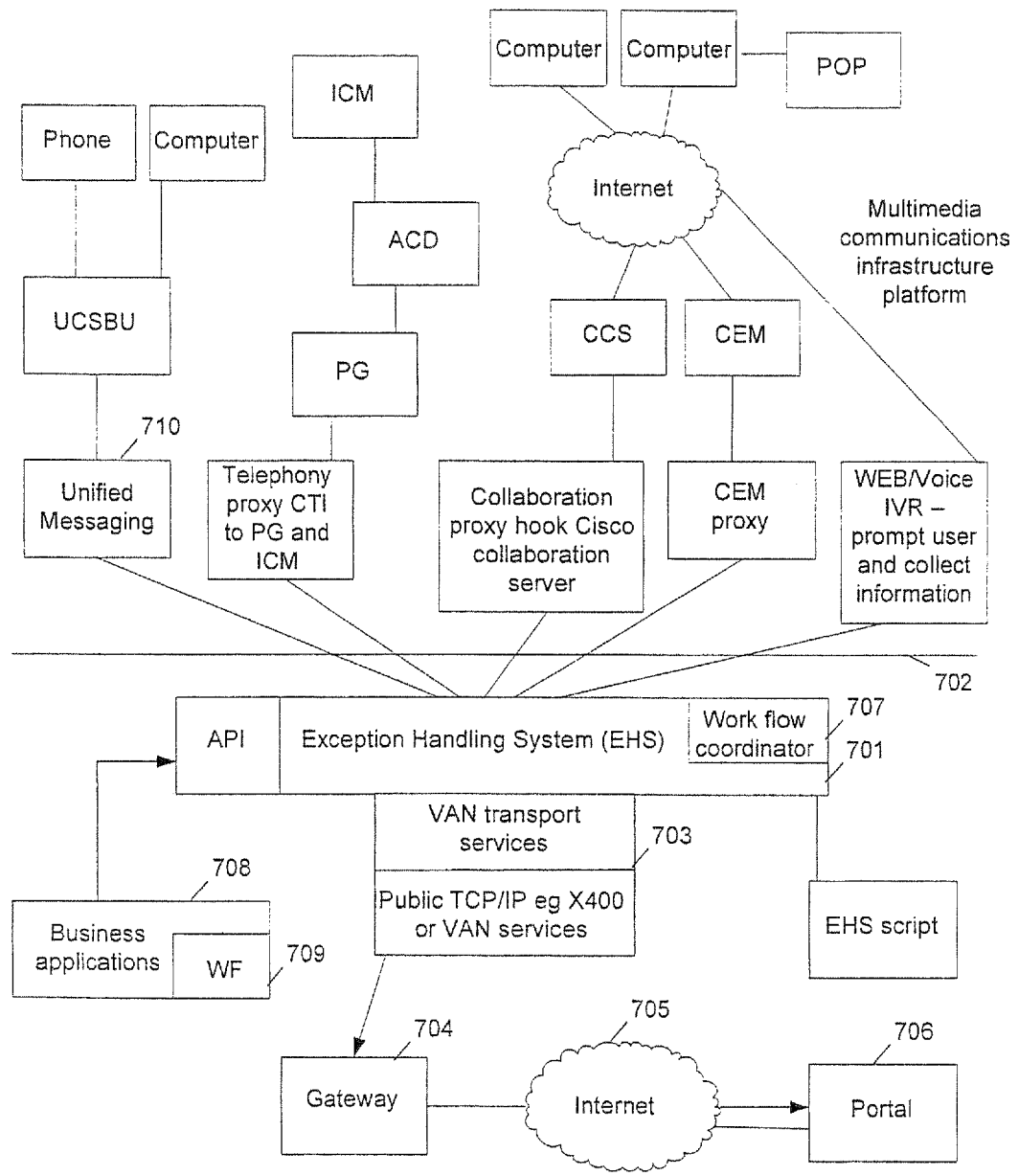
FIG. 7 shows the currently preferred embodiment of the Exception Handling System (EHS).

FIG. 7 shows the currently preferred embodiment of the Exception Handling System (EHS) 701. There are three parts of the Multimedia Infrastructure shown above line 702, business applications that generate transaction orders, and the Exception Handling System 701. In this figure, the EHS sits on top of a VAN transport engine 703 which, in turn, sits on top of a public VAN Protocol TCP/IP gateway 704. The Gateway 704 provides access to the Internet 705 and Portal 706. Alternatively, the EHS could be designed to sit in the Multimedia Infrastructure or within the business application itself. Also shown, the Workflow Coordinator 707 has a default set of workflow. The VAN has a protocol converter connected to business applications 708. The WF 709 is run in a business application and constructs an order and sends it out over the net (e.g., cXML). There is a protocol boundary at the exception handling system.

The EHS system 701 includes a return receipt policy and expects that the order policy defined in the multimedia infrastructure system. The EHS system 701 contains three principle components. First, it contains scripts that define the terms of failure for the business processes and transactions. Second, it contains the specification for the failure recovery workflow. And third, it adds failure conditions (e.g., return receipt and time out failures) and recovery procedures. The EHS is invoked once an error condition or timeout is raised. This is the abnormal case or exception that will invoke the EHS system launching the workflow recovery with contextual media selection. It should be noted that Unified Messaging 710 includes communication; message storing/forwarding; and realtime call management.

Figure 8:
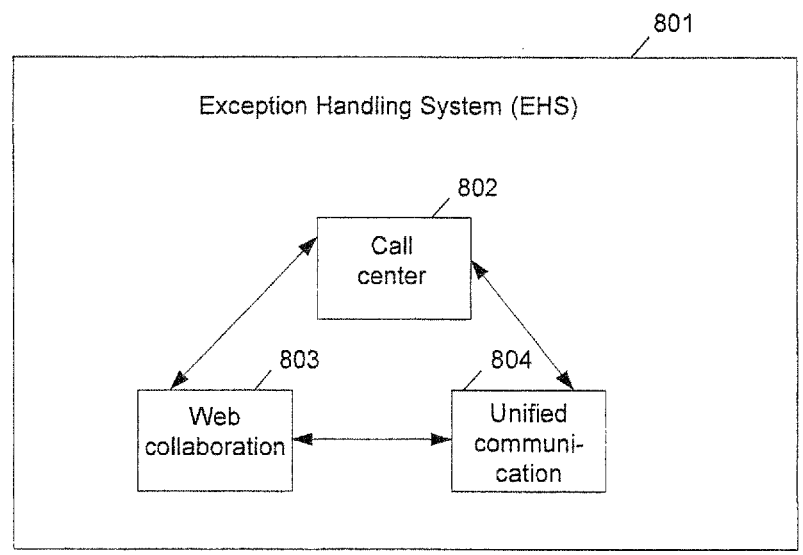
FIG. 8 shows an exemplary Exception Handling System comprised of the integration of call center technology, web collaboration technology, and unified communication technology.

As shown in FIG. 8, the Exception Handling System 801 is comprised of the integration of three primary technologies: call center technology 802, web collaboration technology 803, and unified communication technology 804. The integration of these three technologies integrates human communications into high value business transactions that require quick resolution of opportunity or exception handling (e.g., links workflow with the exchange service center); develops an proactive role for service centers that can put the right people together at the right time to do real-time secure business; cuts the cycle time to complete business by engaging customer collaboration; and enhances the B2B exchanges role to provide either human collaboration service or provide the platform for business ready business to supplier direct communication.

In the currently preferred embodiment, the call center technology is implemented as an Intelligent Contact Manager (ICM). The ICM comprises a communications system and method for automatically making telephone routing decisions with global authority based upon information gathered in real time from the entire communications system and global optimization criteria. It permits unified central control and management for the entire system. ICM software creates an enterprise-wide customer contact platform by integrating multi-vendor networks, automatic call distributors, voice response systems, Web servers, databases, desktop applications, agents and other resources. ICM software combines Pre-Routing and Post-Routing capabilities with an extensive management reporting system and supports distributed fault tolerance to ensure the mission-critical reliability needed for customer interaction.

Figure 9:
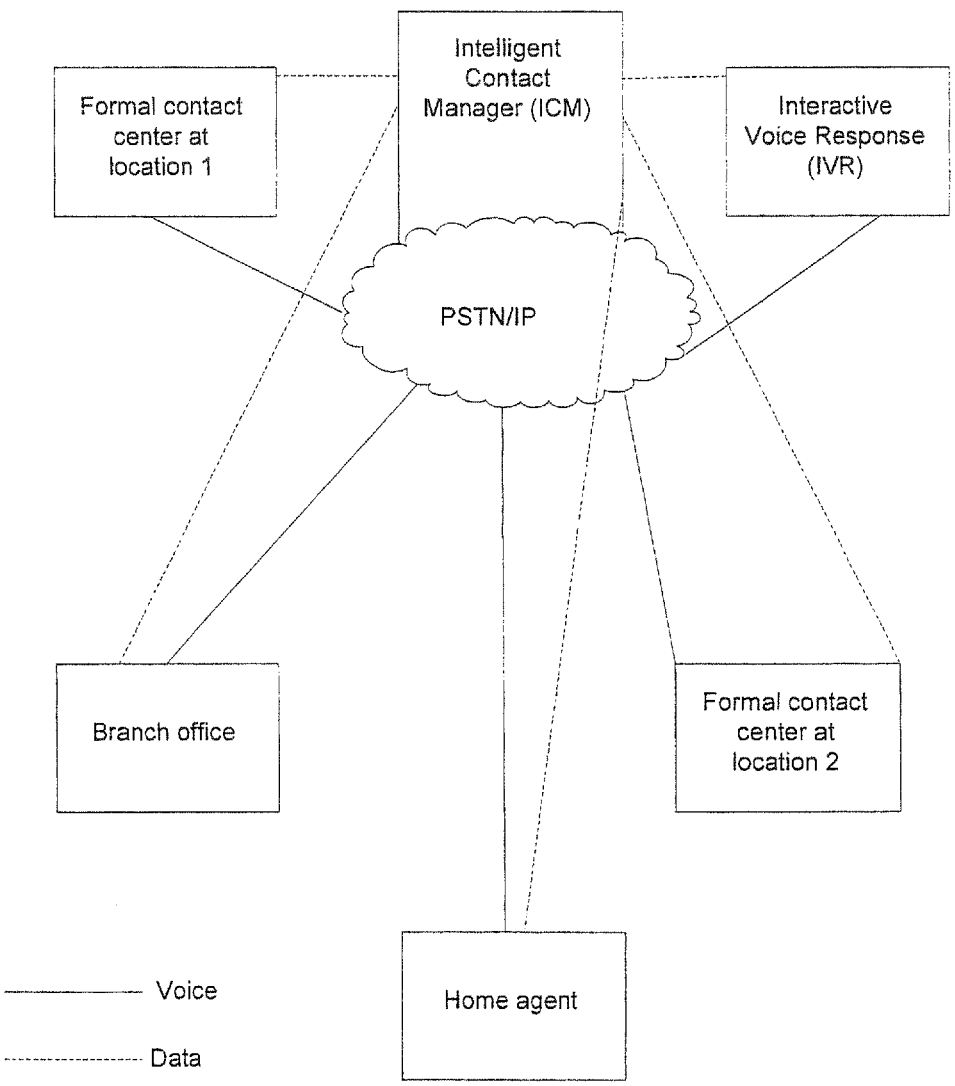
FIG. 9 shows one embodiment of an Intelligent Contact Manager.

FIG. 9 shows one embodiment of an ICM. The ICM performs pre-routing, post-routing, customer-profile, computer telephony integration (CTI), enterprise-wide reporting, web interaction, remote agent support, IVR integration, and workforce management integration functions. For ICM implementations with a carrier network connection, the Pre-Routing function makes a routing decision for each call while it is still in the network and before it is sent to a contact center resource. This capability enables the platform to effectively segment callers, balance calls across the enterprise and deliver each contact to the best enterprise resource the first time. The Post-Routing provides the intelligent distribution of contacts already connected to a peripheral (automatic call distributors ACD, PBX, IVR, or Web/e-mail server) in a company's private network.

When a contact requires redirection, ICM software applies the same business logic used in pre-routing and instructs the peripheral to send the contact to the best available enterprise resource. For contacts flowing between sites, among agents or skill groups, and into or out of IVRs, post-routing optimizes each customer's entire transaction. The ICM system can include software to extend the sources of data available for making contact-routing decisions and for populating agent desktop applications. For instance, ICM software is able to perform a customer-profile database lookup during routing to more effectively segment customers and determine the optimal destination for each contact. Moreover, information obtained from customer relationship management (CRM) packages including Clarify, Siebel, Vantive, and others can be used to even more precisely match customers with agents and expand the data available to screen-pop applications. The information obtained is delivered to the selected agent with the contact, maximizing efficiency by eliminating data retrieval from the desktop.

The ICM software enables users to deploy a complete network-to-desktop CTI strategy, including comprehensive functionality at the agent's workstation. It delivers a uniquely rich set of data to business applications, providing enterprise-wide call-event and customer-profile information to a targeted agent desktop or business server. The ICM solution empowers companies to more effectively utilize their corporate resources with minimal custom development or systems integration, enabling an organization to implement CTI quickly and cost-effectively. At the server level, ICM software manages the availability of real-time and historical information provided by multiple networks, ACDs, IVRs, Web servers, business applications, databases, and the system itself. ICM software also enables the enterprise-wide, normalized collection of real-time and historical data necessary for mission-critical contact center reporting. The open architecture of ICM software allows for the consolidation of timely and accurate information from carrier networks, the Internet, ACDs, IVRs, Web servers, databases, business applications, individual agent desktops and other resources.

Contact, customer and peripheral data are collected and stored in a Microsoft SQL Server database for use in real-time and historical reporting. With agent reporting, data relative to individual agents in the contact center enterprise can also be collected, eliminating the need to gather this information from individual switches, while providing users increased reporting flexibility and a comprehensive picture of agent activity. Furthermore, with ICM software, customers who need information beyond that provided on a corporate Web site can request immediate assistance from a contact center agent via the Web. These real-time Web requests are routed by the ICM system using the same business rules applied to contacts arriving from a carrier network. Every request, with the accompanying customer-profile data collected over the Web, is delivered to the most appropriate agent anywhere in the enterprise.

Remote agent support extends the ICM environment by providing CTI, contact distribution, and reporting capabilities to branch-office and small office/home office (SOHO) agents, as well as to knowledge workers throughout the enterprise. In addition to skill-based routing, the product provides softphone, screen pop, and third-party call control functionality for remote agents—delivering a single, network-to-desktop CTI solution for the enterprise. By incorporating agents from beyond a contact center's physical location, the ICM solution enables companies to better utilize existing and on-demand resources, fully extend CTI functionality across an entire enterprise regardless of agent location, and eliminate the need for ACD-extension products. IVR integration supports customer identification and segmentation, skill-based routing, and IVR load balancing while extending the value of IVR investments. ICM software's open IVR interface allows any IVR application to communicate with the platform, enabling the IVR to act as a routing client, as a managed resource, as a queue point, and as an information source for consolidated real-time and historical reports.

A service control interface enables ICM software to control IVR scripting, providing a single, unified scripting environment to which business rules can be applied. This also supports call queuing at a premises- or network-based IVR and pulls calls from queue when an appropriate agent becomes available anywhere in the enterprise. The ICM software leverages contact-volume forecast data and agent schedules generated by workforce management systems, enabling a company to more effectively allocate daily resources while facilitating long-term planning. For example, scheduling data can be used in routing decisions and to generate adherence reports comparing forecasted versus actual performance.

An ICM, as may be utilized in the present invention, is described in U.S. Pat. No. 5,878,130, "Communications System And Method For Operating Same"; U.S. Pat. No. 5,848,143 "Communications System Using A Central Controller To Control At Least One Network And Agent System"; and U.S. Pat. No. 5,546,452 "Communications System Using A Central Controller To Control At Least One Network And Agent System" which are incorporated by their entirety herein.

The web collaboration engine comprises a web server having two-way interactivity which enables representatives to share information with customers over the Web, including Web pages, forms or applications, while conducting a voice conversation or text chat, using nothing more than a common Web browser. With the web server and its web collaboration software, businesses can deliver answers to specific questions backed up with real-time charts, illustrations, facts and figures; walk them through the completion of shared, Web-based forms or applications; assist them with solving difficult technical problems; provide live sales presentations, software demonstrations or training sessions to groups of people scattered across the country or around the world.

Increasingly, the Web is becoming a vital customer channel, with company Web sites generating both sales and service opportunities. The system is designed to handle customer requests across media, and can combine telephone and Web contact into a single interaction to provide true Web collaboration. Collaboration sessions can use all the services of the system, including routing, reporting, and CTI. For Web-based calling, a "push to talk" button on a Web page causes a call to be established through a Web gateway to a traditional or VoIP ACD agent. In addition to voice, text chat interactions are supported. In all cases, the system supports collaborative browsing in parallel with the call, allowing the agent to see the Web page used by the caller and managing the caller's browser during the call.

In the currently preferred embodiment, the web collaboration technology encompasses the following functions. Page sharing is used to push a web page for another party to view. Follow-me features enable one to view a series of pages without having to push each page. A formshare functionality helps complete a web form jointly with an agent. The text chat feature allows parties to chat over the web, thereby avoiding voice calls. An application demo feature grants an agent the ability to demonstrate a software application over the Internet. Furthermore, application sharing enables customers to interact with an application. In addition, white-boarding allows parties to interactively use a white board to draw, text, etc. Other functions can include one-to-many and many-to-many conferencing as well as cyberseminars whereby large online conferences can be held for hundreds of participants. These and other functions are readily available as WebLine Collaboration Server products from WebLine, Inc., which is now part of Cisco, Inc. Examples of web collaboration technology as may be practiced by the present invention are disclosed in the patent applications entitled, "Copy Server For Collaboration And Electronic Commerce," filed Jul. 6, 1999, Ser. No. 09/347,870 and "Method And Apparatus For Providing Shared Access To An Application," filed Nov. 23, 1999, Ser. No. 60/167,551, both of which are assigned to the assignee of the present invention and which are incorporated by their entirety herein.

The unified communication feature of the present invention provides seamless unification of Internet and voice applications. Unified communication bridges telephony and IP networks, thereby allowing users to send, receive and manage messages from any access device, regardless of the message type. That means users can listen to e-mail messages from the phone, voice messages through their PC, and forward fax messages to other e-mail users, in addition to a variety of other benefits. The unified communication system includes standard administration, including adding, modifying and deleting subscribers, and basic message management. Also included is a Telephone User Interface (TUI), Web access, and e-mail client access to the service. Additional enhancements include a variety of Notification Services, Call Services and Development Services.

Figure 10:
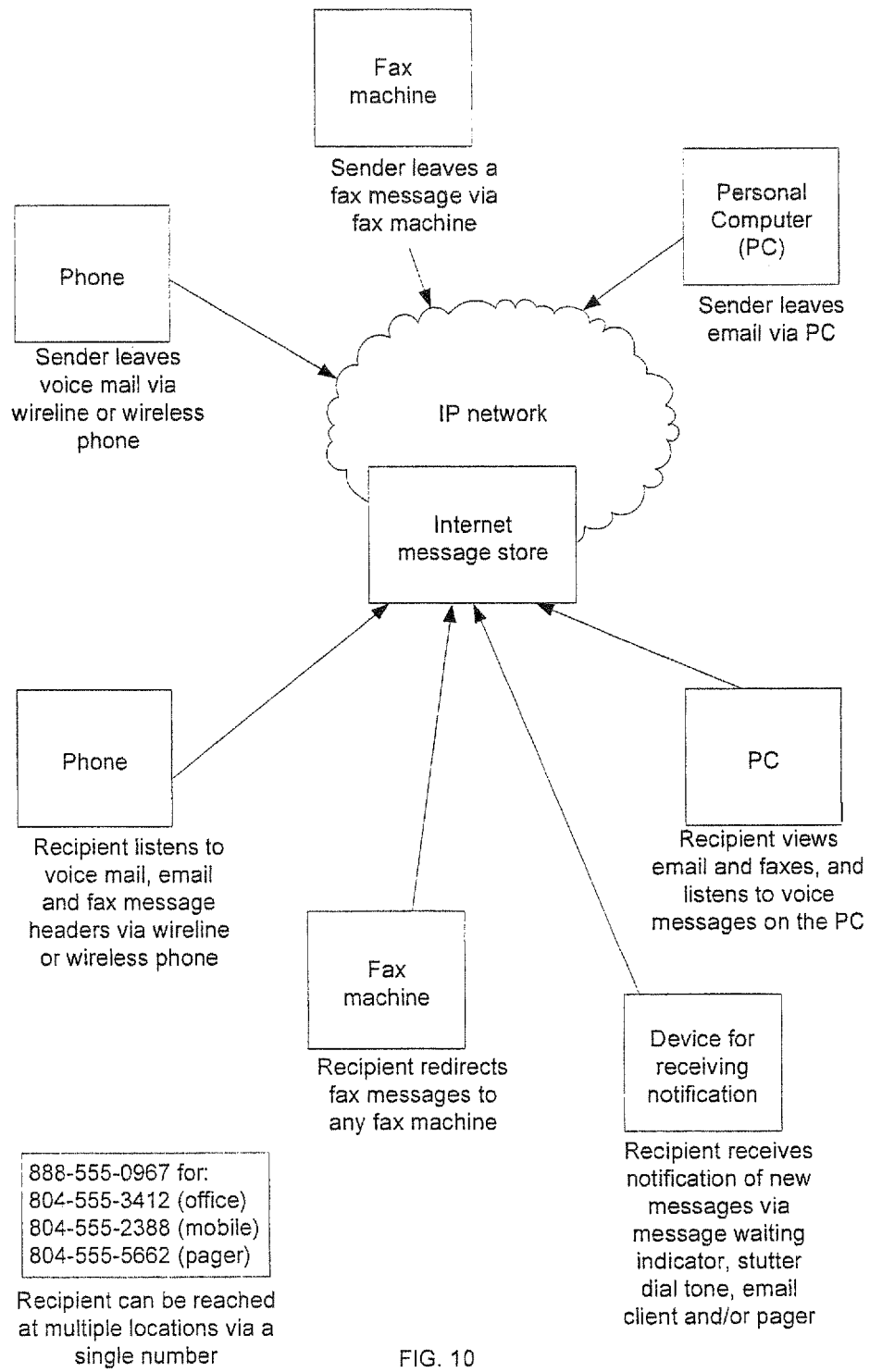
FIG. 10 shows an exemplary unified communication system.

As shown in FIG. 10, the unified communication product is a suite of applications offering the following services: Voice Mail over IP; Fax Mail over IP; and E-Mail. Voice Mail over IP allows subscribers to check for and access messages from any telephone. Callers have an option of leaving multiple messages for a single subscriber, or leaving messages for multiple subscribers during a single call. Callers can transfer to another extension at any time during a messaging session. Callers can locate a subscriber's mailbox using name or numeric addressing. Subscribers can place a call within a messaging session. Calls are placed by either directly returning a call from a using the ANI retrieved with that message, or by dialing a number for the system to call. When the call is completed the subscriber returns to the mailbox "bookmark" which is the last message they heard before placing the call. Furthermore, voice messages can be forwarded as e-mail attachments to any e-mail user. In addition, a user can be reached from a single number or reached from an inbound call control center.

Fax Mail over IP allows subscribers to receive and print faxes from their mailbox. One can print faxes from the subscriber's inbox, view faxes as .tif files from the PC e-mail client, and save them in PC folders. From the phone, a subscriber can redirect a fax to any fax machine or even listen to fax headers. A subscriber can forward fax messages as e-mail attachments to any e-mail user. Moreover, unified communication allows the complete integration of voice and fax messages within a standard e-mail client interface. It has the ability to identify voice, e-mail and fax messages in an e-mail inbox. Voice messages can be played as streaming audio or wave files through the PC. Alternatively, subscribers can listen to e-mail messages from a telephone. Subscribers can be notified via pager, stutter dial tone, or message waiting indicator on a telephone set when new voice messages are received, new fax messages are received, or when new e-mail messages are received.

Figure 11:
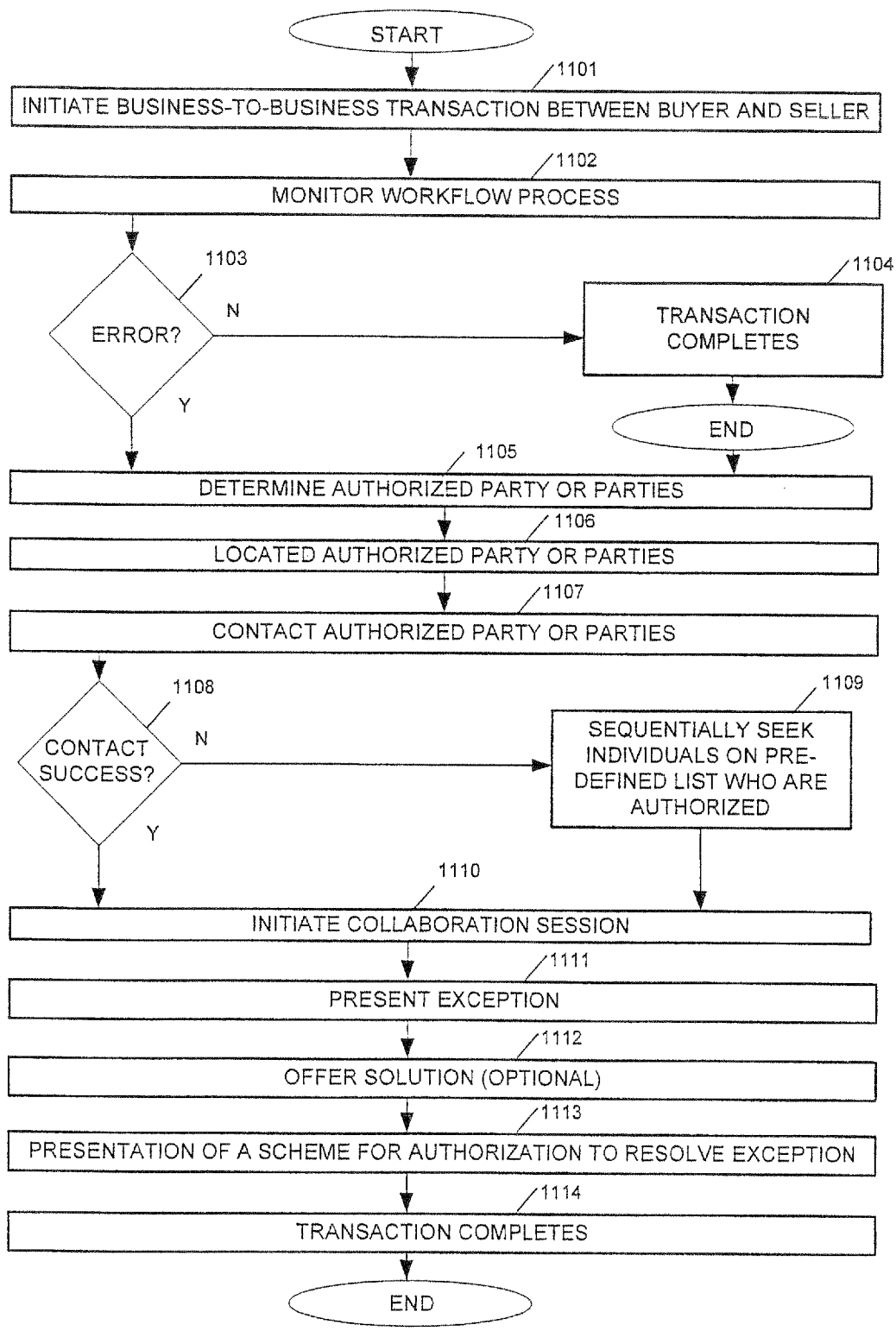
FIG. 11 is a flowchart describing the steps of the exception handling process according to the currently preferred embodiment of the present invention.

FIG. 11 is a flowchart describing the steps of the exception handling process according to the currently preferred embodiment of the present invention. Initially, the buyer and seller reach an agreement on the terms and conditions of a B2B transaction, step 1101. The workflow procurement process for executing the B2B transaction is then continuously monitored at each stage for any exceptions which may occur, step 1102. If there are no errors, the workflow process is deemed to be successful, and the B2B transaction completes, step 1104. However, any timer expirations, transaction exceptions, and network exceptions occurring during the workflow procurement process are immediately flagged by the exception handling system, step 1103. The authorized party or parties are then determined in step 1105. This can be accomplished by using a computer to search through a vendor's database; a network-based, shared LDAP directory; or some other type of vendor information structure to determine the designated individual who has the authority to consummate a transaction of this type. Once the authorized part(ies) have been identified, their locations are then determined by the exception handling system, step 1106. And those particular individuals are contacted, step 1107. The identification and location processes are accomplished through the search and find technology enabled by the unified communication system.

In one embodiment, a hierarchical list of individuals who have been designated as being qualified to make decisions are stored in a list format. If the first listed individual cannot be immediately reached, then the exception handling system tries to reach the next person on that list. The exception handling system sequentially tries each of the listed personnel until someone is reached who can address the exception, step 1109. For example, a purchasing agent responsible for that particular B2B transaction may temporarily be unavailable at the moment. The exception handling system looks up another purchasing agent who can then handle the exception in place of the unavailable purchasing agent. If no purchasing agents are currently available, the exception handling system sequential traverses the list and attempts to contact a purchasing manager. If there are no managers, the director, vice-president, etc. can in turn be contacted. The exception handling system moves up the chain of command through those individuals identified as having higher and higher signatory authority.

If the exception can be resolved by a single individual and that particular individual can be located and contacted, then steps 1111-1114 are executed for just that person. The exception is presented, step 1111. This can be done through an automated voice recording, via email, facsimile, or realtime computer generated messaging. The individual would send a confirmation acknowledging notification of the exception. Thereupon, the exception handling system could optionally propose a solution, step 1112. For example, if there was an error in the transmission, the exception handling system could prompt the individual as to whether they wish to resend the transaction. The exception handling system has the intelligence to identify the error to the user. For instance, if a field in the form becomes corrupted or is not filled in, that particular field can be highlighted. Furthermore, the exception handling system has the ability to present a scheme which enables that individual to resolve the exception. For example, a list of options can be presented to an individual. The individual could select an option and click on a button which finalizes his or her decision. In one embodiment, the exception handling system proposes a solution and just lets the individual electronically verify (e.g., electronic signature) that the solution is satisfactory, step 1113. In this manner, someone not familiar with the B2B process can resolve the exception with minimal expert knowledge. Alternatively, a service agent can be brought in to help a high level manager authorize by filling in the form(s). An agent can be brought in to facilitate the process at any time. Thereby, the exception is handled such that the B2B transaction can complete.

If, however, the exception is of the type which requires two or more parties to resolve, then a collaboration session is initiated between those parties of interest, step 1110. This collaboration session can be either telephone-to-telephone; telephone-to-PC; or PC-to-PC. For increased flexibility, the parties can take advantage of video teleconferencing, web meeting (e.g., Powerpoint presentations), and web collaboration (e.g., page sharing, follow-me, form share, text chat, application demo, application sharing, and white boarding) to help resolve the exception. During the collaboration session, the parties are presented with a description of the exception, offered a solution, and presented with a scheme for resolving the exception, steps 1111-1114. The parties reach an agreed upon solution, and the transaction successfully completes, step 1114. It should be noted that steps 1102 and 1113 are all executed automatically by the exception handling system of the present invention.

There are several advantages offered by the present invention. One advantage for utilizing the exception handling system is the ability to locate the correct party but different media using the unified communication capability of the system. Once the correct party is located they can transact business by accepting or authorizing business transactions that they are authorized to accept. At present, there is no sophisticated multimedia location capability in any of the preferred order processing programs. Also, once an exception is understood and the correct parties are located, one can establish a sophisticated collaboration session that specifically enables a business transaction to be completed or better understood by means of the advanced web collaboration technology as discussed in detail in the aforementioned collaboration examples. Thereby, a business-to-business exchange can be set up with the transactions defined by e-mail and LDAP containing XML data rather than some prior art synchronous protocol.

Some examples of how the present invention may be used is now described. The present invention is applicable for Demand Planning. Suppose that a planner would like to explain a shift in demand planning and confirm an increase is quantity of material required above the current allocation limit allowed for by a supplier. By using the present invention, an authorized representative can be located using unified communication technology and an Internet session can be established whereby page sharing utilized to display the new shift. Identifying requirements with a sudden shift in demand for the upcoming months. Another example entails a supplier having trouble running their software to complete a supply chain optimization scheme in a sophisticated supply chain optimization software program (such as the ones sold by i2 for example). Using the present invention, they can call the i2 engineer and the engineer runs a demo using the communication application demo via there PC in real time to demo how to handle the complex problem.

By using web collaboration tools, the present invention is applicable for requisitions. In one example, a procurement process coordinator is trying to fill out a box and classify a part that is being rejected by the suppliers system after electronic communication requirements. By using the present invention, the two parties share the form using collaboration and correctly fill out the form to get the order in on time to meet manufacturing demand using the formshare collaboration function.

For purchasing purposes, suppose that a procurement process coordinator is trying to check the spot price for a purchase that they are about to make but cannot find the purchasing agent of the party this wish to purchase from. By using the notification and find features of the unified communication system, the present invention can link two or more responsible parties. The two parties can share the form using collaboration and correctly fill out the form to get the order in on time to meet manufacturing demand by using the present invention.

The present invention can be used to facilitate approvals. For example, suppose that an order is placed that exceeds the buyers authorization level. The present invention locates the approver and a session is established or voice or push button authorization is achieved using IPIVR or WAP technology. Locating users is currently accomplished by the unified communication to locate an approved authorizer: the technology uses a mail message server platform, but other platforms can be used to accomplish the same end.

The present invention may also be used for ordering purposes. Suppose that buyer would like to place an order on but need some product specifics clarified. They could use the present invention to establish a collaboration session between a procurement agent and a business partner (e.g., a supplier) to resolve product order questions. Moreover, exceptions in receipt can be readily handled by the present invention. Often, material received damaged and one needs to notify responsible party as soon as possible to avoid material shortage. With the present invention, one can send a Unified message to responsible procurement attendants. System checks from agent to agent until an available agent is identified. Thereupon, a Return for Material Authorization (RMA) or other exception notification can be given immediately and a session is initiated.

Again, through the use of web collaboration, with respect to distribution, whereby material needs to be rerouted to a different location due to a material shortage at a particular manufacturing plant, the appropriate person in the logistics organization that can reroute the shipment. Similarly, for payments, during a real time portal procurement auction some question may arise regarding the terms of the purchase conditions and payment methods. This problem could be solved with the present invention by using text chat during a web collaboration session whereby this problem is described then pushed to the knowledgeable parties while the auction is in progress. Hence, there is no need to stop the bidding. Another common exception is if there is a problem with loading an acknowledgment for notification of receipt of goods at a partner gateway, as a result, the payment mechanism is inactive. One solution is to use the present invention to load the file triggered by the collaboration software monitoring exceptions at the gateways of the partners. A unified communications search for the appropriate party is initiated and the correct person is located. A session is established that clearly identifies the file in question and the order received is acted on by the parties after a session. Another common exception is when the response time for a procurement event is exceeded (most procurement process applications monitor the time between events and processes). The present invention handles this exception by using the procurement application to notify the unified communications solution which will then contact the appropriate parties immediately who can authorize the immediate release of materials or payment via voice recognition.

The present invention can aid in strategic procurement processes. For example, for engineering design, suppose that a design engineer is having trouble visualizing an aspect of an engineering design and needs to step through the problem with another engineer at another company. By utilizing the follow me feature of the web collaboration technology, the system of the present invention can allow the two parties to co-operate on the application design and have a mutual pointer with which they can highlight the areas of interest while the two parties speak over telephone or through an established test chat session. Engineering Change orders would benefit greatly from the Exception Handling Engine. In this case, the appropriate engineer is contacted if the change requires urgent attention and is beyond a normal document process transaction scenario. Once the appropriate engineer is contacted collaboration can occur as discussed above. Furthermore, Engineering co-development is a process which occurs between two businesses but is outside order transaction processing. Engineering business-to-business co-development can be assisted with the Exception Handling Engine. In this case, the appropriate engineer is contacted if the change requires urgent attention and is beyond a normal document process transaction scenario. Once the appropriate engineer is contacted collaboration can occur as discussed above.

It should be noted that the Exception Handling System solution is not restricted in residing on the Internet gateways. It can be inserted or designed into direct procurement processes and applications, too. In the direct procurement process a business queries the Internet to find available suppliers, manufacturers, etc. To do this they can query the Internet directly using ordinary search means or they can use sophisticated search technology infrastructure (e.g., Microsoft Biztalk, HP eSpeak or Sun Jini, etc.). After a potential source has been identified the specific involved parties can collaborate using the proposed collaboration technology. For example, they can use unified communications technology to establish contact with a potential supplier. They can consummate a business deal by phone using the phone's touch pad or voice. Similarly, an Internet collaboration sessions can be formed whereby the two parties can utilize the aforementioned Internet collaboration to consummate their transaction.

Thus, a multimedia B2B order processing error detection resolution engine has been disclosed. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An apparatus comprising:
one or more processors; and
a memory coupled to the one or more processors comprising instructions executable by the one or more processors, the one or more processors operable when executing the instructions to:
forward packetized workflow procurement process communications exchanged between a customer endpoint and a supplier endpoint over first and second networks, the packetized workflow procurement process communications representing one or more purchasing transactions exchanged between transactional parties;
generate a messaging protocol receipt that confirms that the packetized workflow procurement process communications were successfully delivered;
monitor the packetized workflow procurement process communications to determine whether final receipts are sent between the transactional parties to indicate consummation of the purchasing transactions;
identify one or more exceptions associated with disrupting consummation of the purchasing transactions, when the purchasing transactions are not consummated;
generate a notification indicating a failure condition for the purchasing transactions when the identified exceptions correspond to a flagged type;
access a database that lists both potential distributees for the generated notification including agents corresponding to the transactional parties and business information corresponding to the agents;
generate, using the database and according to the business information, a ranked listing of the agents for intelligently distributing the generated notification; and
distribute the generated notification to one or more of the agents intelligently according to the ranked listing to resolve the identified exceptions.

2. The apparatus of claim 1 wherein the one or more processors are further operable to:
determine whether the identified exceptions correspond to a first flagged type that occurs when a sending application does not receive a confirmation within a predetermined time period, a second flagged type that occurs when either the first or the second network are unable to transfer one or more of the packetized workflow procurement process communications, or a third flagged type that occurs when the packetized workflow procurement process communications include characteristics out of predetermined boundaries;
generate the notification when the identified exceptions correspond to one or more of the flagged types; and format the generated notification to indicated the determined flagged.

3. The apparatus of claim 2 wherein the one or more processors are further operable to compare the determined flag type to the business information for ranking the agents for intelligent distribution of the generated notification.

4. The apparatus of claim 1, wherein the one or more processors are further operable to:
receive fulfillment offers from a plurality of suppliers;
rank the suppliers according to proposed prices and delivery times included in the fulfillment offers to select a supplying one of the transactional parties;
send the selected supplying one of the transactional parties a purchasing request; and
identify the exception of the flagged type when the selected supplying one of the transactional parties does not respond to the purchasing request in a predetermined amount of time.

5. The apparatus of claim 1 wherein the one or more processors are further operable to:
determine whether the identified exceptions require involvement from more than one of the agents;
establish a collaboration session between the required agents independently of any requests from the required agents when the identified exceptions require involvement form more than one of the agents; and
send the generated notification to the required agents automatically and independently of any prompting from the required agents.

6. The apparatus of claim 1 wherein the one or more processors are further operable to:
send one or more messages to a highest ranked one of the agents included in the ranked listing;
observe any responses from the highest ranked agent to determine whether the highest ranked agent can be located; and
send messages to a second highest ranked one of the agents included in the ranked listing when the responses are not observed.

7. The apparatus of claim 1 wherein the one or more processors are further operable to:
analyze the business information included in the database to identify a location for contacting a highest ranked one of the agents included in the ranked listing; and
send one or more messages to the highest ranked agent, the messages addressed to the identified location.

8. An apparatus comprising:
one or more processors; and
a memory coupled to the one or more processors comprising instructions executable by the one or more processors, the one or more processors operable when executing the instructions to:
forward packetized workflow procurement process communications exchanged between a customer endpoint and a supplier endpoint over first and second networks, the packetized workflow procurement process communications representing one or more purchasing transactions exchanged between transactional parties;
monitor the packetized workflow procurement process communications to determine whether final receipts are sent between the transactional parties to indicate consummation of the purchasing transactions;
identify one or more exceptions associated with disrupting consummation of the purchasing transactions, when the purchasing transactions are not consummated;
generate a notification indicating a failure condition for the identified purchasing transactions when the identified exceptions correspond to a flagged type;
access a database that lists both potential distributees for the generated notification including agents corresponding to the transactional parties and business information corresponding to the agents;
generate, using the database and according to the business information, a ranked listing of the agents for intelligently distributing the generated notification; and
distribute the generated notification to one or more of the agents intelligently according to the ranked listing to resolve the identified exceptions.

9. The apparatus of claim 8 wherein the one or more processors are further operable to:
determine whether the identified exceptions correspond to a first flagged type that occurs when a sending application does not receive a confirmation within a predetermined time period, a second flagged type that occurs when either the first or the second network are unable to transfer one or more of the packetized workflow procurement process communications, or a third flagged type that occurs when the packetized workflow procurement process communications include characteristics out of predetermined boundaries;
generate the notification when the identified exceptions correspond to one or more of the flagged types; and
format the generated notification to indicated the determined flagged.

10. The apparatus of claim 9 wherein the one or more processors are further operable to compare the determined flag type to the business information for ranking the agents for intelligent distribution of the generated notification.

11. The apparatus of claim 8, wherein the one or more processors are further operable to:
receive fulfillment offers from a plurality of suppliers;
rank the plurality of suppliers according to proposed prices and delivery times included in the fulfillment offers to select a supplying one of the transactional parties;
send the selected supplying one of the transactional parties a purchasing request; and
identify the exception of the flagged type when the selected supplying one of the transactional parties does not respond to the purchasing request in a predetermined amount of time.

12. The apparatus of claim 8 wherein the one or more processors are further operable to:
determine whether the identified exceptions require involvement from more than one of the agents;
establish a collaboration session between the required agents independently of any requests from the required agents when the identified exceptions require involvement form more than one of the agents; and
send the generated notification to the required agents automatically and independently of any prompting from the required agents.

13. The apparatus of claim 8 wherein the one or more processors are further operable to:
send one or more messages to a highest ranked one of the agents included in the ranked listing;
observe any responses from the highest ranked agent to determine whether the highest ranked agent can be located; and
send messages to a second highest ranked one of the agents included in the ranked listing when the responses are not observed.

14. The apparatus of claim 8 wherein the one or more processors are further operable to:

analyze the business information included in the database to identify a location for contacting a highest ranked one of the agents included in the ranked listing; and send one or more messages to the highest ranked agent, the messages addressed to the identified location.

* * * * *